US009876841B2

(12) United States Patent
Woerndle et al.

(10) Patent No.: US 9,876,841 B2
(45) Date of Patent: Jan. 23, 2018

(54) CONTEXT-AWARE CONTENT DELIVERY

(75) Inventors: Peter Woerndle, Wangen im Allgau (DE); Ignacio Mas Ivars, Tullinge (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 247 days.

(21) Appl. No.: 13/884,094

(22) PCT Filed: Nov. 9, 2010

(86) PCT No.: PCT/IB2010/003041
§ 371 (c)(1),
(2), (4) Date: May 8, 2013

(87) PCT Pub. No.: WO2012/063094
PCT Pub. Date: May 18, 2012

(65) Prior Publication Data
US 2013/0238755 A1    Sep. 12, 2013

(51) Int. Cl.
*G06F 15/16* (2006.01)
*H04L 29/08* (2006.01)
(52) U.S. Cl.
CPC .................. *H04L 67/02* (2013.01)
(58) Field of Classification Search
CPC ..... H04L 67/02; H04L 29/06; H04L 67/2814; H04L 45/123; H04L 45/302; G06F 17/30899
See application file for complete search history.

(56) References Cited

U.S. PATENT DOCUMENTS

| | | | | |
|---|---|---|---|---|
| 6,167,441 | A * | 12/2000 | Himmel | 709/217 |
| 6,415,426 | B1 * | 7/2002 | Chang | G06F 17/5072 716/113 |
| 6,775,687 | B1 * | 8/2004 | Binding et al. | 709/219 |
| 8,135,837 | B2 * | 3/2012 | Lee | H04L 12/2821 709/223 |
| 8,214,505 | B2 * | 7/2012 | Jagadeeswaran | H04L 67/02 709/203 |
| 2003/0005118 | A1 * | 1/2003 | Williams | 709/225 |
| 2003/0110234 | A1 * | 6/2003 | Egli et al. | 709/217 |
| 2009/0258660 | A1 * | 10/2009 | Bush et al. | 455/456.5 |
| 2011/0026437 | A1 * | 2/2011 | Roja-Cessa et al. | 370/256 |
| 2011/0076985 | A1 * | 3/2011 | Chami et al. | 455/405 |

FOREIGN PATENT DOCUMENTS

| | | |
|---|---|---|
| EP | 0889418 A2 | 1/1999 |
| GB | 2331600 A | 5/1999 |
| WO | 03/040893 A2 | 5/2003 |

* cited by examiner

*Primary Examiner* — Liangche A Wang
*Assistant Examiner* — Ayele Woldemariam
(74) *Attorney, Agent, or Firm* — Rothwell, Figg, Ernst & Manbeck, P.C.

(57) ABSTRACT

A flexible and context-aware delivery scheme for uniform resource locators builds on a generic representation that can be used for whichever binary content is to be delivered to a client. It can also be applied to improve the network operations of a network operator, the user's perceived quality of experience, and the costs of a content provider that does not need to encode and support different codecs and transport mechanisms.

21 Claims, 2 Drawing Sheets

CONTEXT-AWARE CONTENT DELIVERY

CROSS-REFERENCE TO RELATED APPLICATION(S)

This application claims priority to International Patent Application No. PCT/IB2010/003041, filed Nov. 9, 2010, which is incorporated by reference in its entirety.

TECHNICAL FIELD

This invention relates to electronic communication networks, and more particularly to content delivery in packet-switched communication networks.

BACKGROUND

In current communication networks, mobile and fixed, operators face an increasing amount of "over the top" (OTT) content, which is to say, audio, video, or other content or applications that are delivered over an alternative to an operator's main delivery infrastructure. Thus, operators and network providers are increasingly reduced to simple bit pipes for data-intensive content providers such as YouTube, LLC, and other streaming-media providers.

For example, in December 2009, Amazon.com, Inc., announced a CloudFront web service for content delivery that uses Flash streaming and a real time messaging protocol (RTMP) from Adobe Systems Inc., making streaming easy to use even by unskilled users and further increasing OTT traffic in networks. Information about the CloudFront service is available at http://aws.amazon.com/about-aws/whats-new/2009/12/15/announcing-cloudfront-streaming/. The RTMP is described in Real Time Messaging Protocol Chunk Stream (June 2009), which is available at http://www.adobe.com/devnet/rtmp/pdf/rtmp_specification_1.0.pdf.

Much OTT content is redundant in the sense that, in many cases, the OTT content represents the same information or even the same media, just provided by different services and providers according to different communication protocols.

A web browser running on a client device is commonly used to access information on a server, or host, computer through the internet, and a browser typically acts as a hypertext transfer protocol (HTTP) client. Although the browser is a common application, browsers run nowadays on many different devices and platforms. Mobile phones, netbook, tablet, laptop and personal computers, television sets (TVs), set-top boxes (STBs), and even kitchen appliances are examples of client devices, or user equipments (UEs), that can have web browsers.

Current browsers identify information resources by uniform resource locators (URLs), and a current URL identifies one respective representation of information—in the best case, exactly that representation that is suitable for the device running the browser. A URL contains or encodes everything needed for delivery of the respective information: source, asset, transport, and possibly delivery parameters, which may facilitate charging for the delivery. URLs were originally specified by Request for Comments (RFC) 1738 (December 1994) by the Internet Engineering Task Force (IETF), and have been generalized and updated to uniform resource identifiers (URIs) as specified by IETF RFC 3986 (January 2005). A URI can be a locator, a name, or both, and a URL refers to the subset of URIs that, in addition to identifying a resource, provide a means of locating the resource by describing its primary access mechanism (e.g., its network "location").

It is possible for any information resource to be identified by a respective URL and accessed via messaging according to a suitable protocol. A user's client software application (e.g., a browser) reads the URL as an input parameter either directly from the user input or from a hyperlink, and the client application then downloads the resource identified by the URL and displays the content to the user, if it is able to do so. In general, the syntax of a URL can be described as follows:

<protocol>://<host>:<port>/<path> in which <protocol> indicates the type of messaging (e.g., HTTP, file transfer protocol (FTP), real time streaming protocol (RTSP), etc.), <host> is typically an internet address of the information, <port> is typically the number of a port used by the host for communication via the <protocol>, and <path> is a host operating system location of the information. The RTSP is specified by IETF RFC 2326 (April 1998).

Since hosts can delete or move information, URLs can lose their validity, and so the HTTP defines a structure of error messages for invalid URLs. The error messages can state either that the resource is not available anymore or that it is now available through a new URL. The latter error message is called an HTTP redirect message, and the redirect can be either static or temporary. Modern client applications are able to interpret HTTP redirect messages and get the resources from the new URLs using HTTP. More and more clients support redirect messages that change the transport protocol. Also, resource identification and redirection is sometimes used for delivery of adapted hypertext markup language (HTML) information (e.g., web pages), in particular for delivery to mobile devices, for example.

Currently, there exist different approaches to separating semantic assets and actual representations of those assets. For example, the Persistent URL (PURL) project maintains a database of addresses that act as permanent identifiers despite Web infrastructure changes. Instead of resolving directly to Web resources, PURLs provide a level of indirection that allows the underlying Web addresses (e.g., URLs and URIs) of resources to change over time without negatively affecting systems that depend on them. This capability provides continuity of references to network resources that may migrate from machine to machine for business, social or technical reasons. Information about the PURL project is available at http://purl.ocic.org/docs/index.html.

Existing approaches to separating semantic assets and actual representations of those assets assume that each representation has a respective URL, which might change over time. Thus, a new URL must be defined for each different coding (or representation) of, say, a media program (or asset). That one-to-one requirement leads to several problems.

A single asset, such as a document, photograph, audio file, movie, etc., can be available in many different formats (representations), with a different URL for each format, but a typical user is just interested in accessing the asset itself, not in any particular one of its many possible representations. Simply presenting a list of hyperlinks to the user, from which the user must choose, results in a loss of operator and provider control over valuable good "bandwidth" because the user is either unaware of or does not consider the operator's or provider's needs. A simple list also reduces usability because a typical user will not understand the differences between the different formats and transport mechanisms represented by the listed different URLs. Moreover, the same asset may be available at several locations, such as content delivery networks (CDNs), streaming services, etc., but a URL known by a user might not be the representation of the asset that is suitable in terms of content location, network bandwidth, and user location. In addition, the same asset can be available through several transport protocols, such as HTTP, FTP, etc., but a URL known by a user might not be suitable for the transport capabilities of the user's device.

Because a URL directly addresses one respective representation of an asset, the representation is delivered to a user either directly or through one or more redirects, which are static, and so no additional information about the delivery context can be taken into consideration to improve the delivery. The static nature of current technology lacks the ability to adapt the reference of a URL at delivery time.

For RTSP-based delivery setups, the session description protocol (SDP) and real time control protocol (RTCP) could be used to negotiate delivery parameters via session invitation protocol (SIP) messaging. The SDP, RTCP, and SIP are specified by IETF RFC 3556 (July 2003), RFC 3605 (October 2003), and RFC 3261 (June 2002), respectively. The SIP is a mechanism for finding endpoints and routing control signals between them and is a set of simple operations, including REGISTER, INVITE, ACK, and BYE. SDP is a protocol for declaring media.

For example, as described in WO 2010/018421 A1 by Magnus Svensson et al. for "Extended Television Reminders", the Internet Protocol Multimedia Subsystem (IMS) in cellular communication networks specified by the Third Generation Partnership Project (3GPP) uses the SIP and the SDP as its basic signaling mechanisms, and media transport is based on the RTSP, among others. Section 5 of 3GPP Technical Specification (TS) 24.229 V7.11.0, IP Multimedia Call Control Protocol Based on Session Initiation Protocol (SIP) and Session Description Protocol (SDP), Stage 3, Release 7 (March 2008) specifies SIP usage at a UE, and Section 6 of 3GPP TS 24.229 specifies SDP usage.

Nevertheless, an RTSP-based delivery is not transparent to the client, which means the user must interact in a complex, unfamiliar, way with the user's device, and is not available for HTTP-based delivery.

Providers like YouTube are already providing assets in different formats to users and choosing automatically which streaming format to use, but providers are not currently able to change the chosen streaming protocol. The choice of which stream to deliver is made based on available information on the server and client, but not on information on the delivery network itself. Thus, the choice misses important aspects for the network operator delivering the bits, such as transport cost.

Existing solutions are usually bound to a specific kind of resource, e.g., a movie clip. For each other resource type, the solution has to be adapted. Additionally, due to the proprietary single-client/single-server architecture of most solutions, existing solutions cannot be extended easily to consider more relevant information.

SUMMARY

We introduce a flexible and context-aware delivery scheme for URLs that builds on a generic representation that can be used for whichever binary content is to be delivered to the client. It can also be applied to improve the network operations of a network operator, the user's perceived quality of experience, and the costs of a content provider that does not need to encode and support different codecs and transport mechanisms.

In accordance with aspects of this invention, there is provided a method of employing a semantic URL corresponding to information to be displayed to a user of an electronic communication network. The method includes generating an information request message that includes a semantic URL and an identifier of a user equipment; sending the information request message to a URL logic node in the communication network; based on the information request message, gathering information relevant for delivery of information corresponding to the semantic URL; and based on gathered information, determining a representation of information corresponding to the semantic URL that is suitable for the user equipment.

Also in accordance with aspects of this invention, there is provided a URL logic node for employing a semantic URL corresponding to information to be displayed to a user of an electronic communication network. The node includes a transceiver configured for exchanging electronic signals with one or more entities of an electronic communication network; an electronic processor programmably configured to handle information carried by the electronic signals; and a memory configured to store retrievable information. The processor is configured to gather information relevant for delivery of information corresponding to the semantic URL included in an information request message received from a user equipment, and based on gathered information, to determine a representation of information corresponding to the semantic URL that is suitable for the user equipment.

BRIEF DESCRIPTION OF THE DRAWINGS

The several features, objects, and advantages of this invention will be understood by reading this description in conjunction with the drawings, in which like reference characters indicate like parts and.

DETAILED DESCRIPTION

As described in more detail below, the inventors have recognized that a URL need not imply a one-to-one relationship between the URL and an information resource but can define a semantic item (e.g., a movie, a news item, etc.). Users need use only such semantic URLs, each of which is a one-to-many mapping between a semantic URL and URLs of representations of the semantic item. The system logic, which keeps track of the semantic URLs, decides per request which representation to deliver based on context information gathered by the system on the fly and from statistical and static resources.

The artisan will understand that semantic and representation URLs can be considered traditional URLs with the one-to-many mapping exposed to the client side as a redirect. This is advantageous because it enables reuse of existing technology on the client side and makes the new technology of this invention transparent to the user equipment (UE).

The invention is described below in the context of an example of a user request handled by the URL logic, and that example can be generalized as described below.

Figure 1:
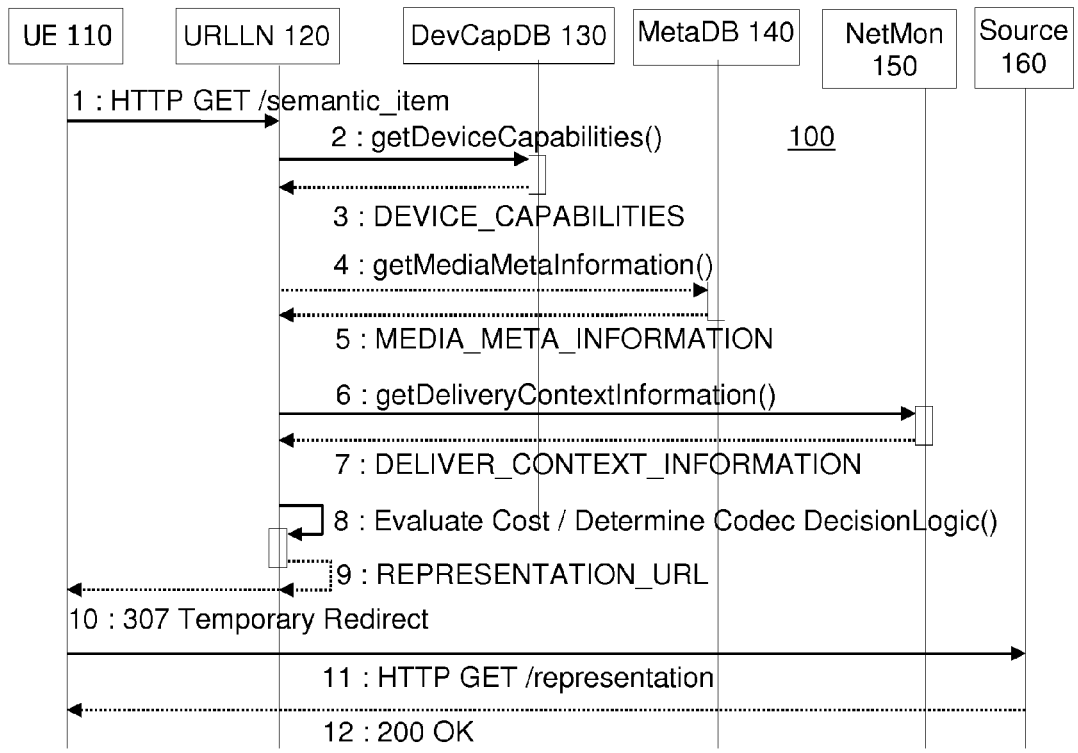
FIG. 1 depicts a communication network and a flow chart of signals among and activities by communication network entities.

FIG. 1 depicts a typical signal flow among entities in a communication network 100 in methods in accordance with this invention. It will be understood that the methods depicted are in a context of an IP network, employing messages appropriate for an IP network, but in general other contexts and other types of messages can be used.

The user accesses a webpage with a UE 110, such as a mobile phone, that runs a client application, such as a web browser. The webpage offers the user a hyperlink to an information asset, such as a media item, and the hyperlink contains or references a semantic URL, which points to a URL logic node (URLLN) 120. It will be understood that hyperlinks on existing websites would be modified to contain the appropriate semantic URLs. Such modification is expected to be readily accomplished for static websites, which typically store hyperlinks in respective databases or generate them automatically, by simply updating the hyperlink databases or generators. As depicted in FIG. 1, clicking on a hyperlink causes the client software on the UE 110 to send an HTTP GET request message for the semantic item to the URLLN 120 (step 1). The HTTP GET request contains information about the asset corresponding to the semantic URL and the requesting UE.

In response to the HTTP GET request message, the URLLN 120 gathers information relevant for the delivery process triggered by the user request. As depicted in FIG. 1, gathering information comprises various ones of steps 2-12 described below, depending on the type of asset requested. It is currently believed, for example, that steps 4, 5, 10, 11, and 12, which correspond substantially to a static redirect, are sufficient if mere asset delivery is requested. If asset delivery suitable for a specific device is requested, then steps 2, 3, 8, and 9 are added. If asset delivery suitable for a specific device with delivery path optimization is requested, then steps 6 and 7, which provide information about the network (e.g., communication link utilization, processing powers of nodes on the delivery path, etc.), are also added.

In step 2, the URLLN 120 queries a device capabilities database DevCapDB 130 for information about the requesting UE. As an identifier for the UE 110, the URLLN 120 can provide the database 130 with a user-agent string from the HTTP GET request. In step 3, the device capabilities database 130 provides to the URLLN 120 information about video and audio codes, bitrates, and resolution supported by the UE 110.

To find a suitable representation of the requested semantic item, the URLLN 130 queries a metadata database MetaDB 140 (step 4) that contains meta information about available representations of the semantic item. Meta information about a representation can include, but is not limited to, one or more of media language, resolution, codec, location, and URL of the representation. In step 5, the metadata database 140 provides to the URLLN 120 its stored meta information about the requested semantic item.

In the arrangement depicted in FIG. 1, information about current network status can also be taken into consideration by the URLLN 120 by having the URLLN query a network monitoring node NetMon 150 for network information, e.g., link quality and available throughput on the communication link to the UE (step 6). In response to the URLLN's query, the network monitoring node 150 provides that information to the URLLN 120 (step 7). Information about link quality and throughput and other network information can be used to avoid jammed links, and thus provide better end-to-end link quality, as well as to use links more efficiently based on known information about the data to be transmitted. Link quality, which includes jitter and packet delay, for example, is an especially important parameter for media streaming. For example, when a communication link is nearly jammed, i.e., operating near its maximum throughput, providing a high-definition (HD) movie on the link would certainly jam the link completely, but providing a lower-resolution movie, e.g., a movie suitable for the small screen of a hand-held device, could fit perfectly into the remaining link capacity.

The NetMon node 150 is a network node that acquires different information from different nodes in the whole network, e.g., the amount of peering traffic on different peering points. In a typical wireless network, such as a Long Term Evolution network according to the standards of the Third Generation Partnership Project, it is currently believed that the NetMon node 150 is a monitoring node that is better implemented in or in association with a core network node rather than in the radio access network.

Based on the information from the databases 130, 140 and node 150, the URLLN 120 determines a representation of the requested semantic item (step 8) that is suitable for the UE 110 and for optimizing other aspects, such as delivery costs for the provider and network operator. The determination can be made by decision logic implemented as either or both of hardware and software in the URLLN 120 that evaluates a predetermined cost function in combination with a decision tree for determining a suitable codec, in particular, a codec that is supported by the UE 110. A determined representation can include more than one representation of a requested asset, e.g., a video stream and a subtitle stream in a suitable language.

An example of a suitable cost function is the following expression:

$$\text{Cost} = A \cdot \text{Codec\_Cost} + B \cdot \text{Resolution\_Cost}$$

in which Cost is the value to be determined; A and B are selectable weights; Codec_Cost is a value either subjectively assigned based on perceived codec "quality" or objectively calculated value based on a representation's bit rate, frame rate, etc.; and Resolution_Cost is an objective measure of a subjective quality expected. A network operator can adjust the Cost value based on a number of factors, such as network status, UE subscription, etc., by selecting the weights. In particular, the weights can be varied according to the current status of the communication link to a UE 110. For example, selecting the weights such that the representation delivered to the UE is highly compressed saves network bandwidth, or throughput, at the same time that it lowers the quality of the user's experience.

An example of the Resolution_Cost parameter is the following expression:

$$\text{Resolution\_Cost} = 0.5 \cdot |(\text{res}X\_a - \text{res}X\_b)/(\text{res}X\_a + \text{res}X\_b)| + 0.5 \cdot \text{Distance\_Aspect}$$

in which resX_a is the resolution of the source representation; resX_b is the resolution of the display on which the representation will be presented; and Distance_Aspect=0 if the aspect_ratio_b=aspect_ratio_a, and otherwise Distance_Aspect=1. Common values of the resolution resX_a are currently 1920×1080 pixels, 1280×720 pixels, and 720×480 pixels, and common values of the resolution resX_b are currently 960×640 pixels, 640×360 pixels, and 480×320 pixels, although it will be appreciated that any suitable values can be used. Common aspect ratio values are currently 16:10, 16:9, and 4:3.

In step 9, the URL of the determined representation is packaged in an HTTP redirect message by the URLLN 120, and the redirect message containing the determined representation URL is sent to the UE 110 (step 10) in response to the UE's HTTP GET message. The UE's client then requests the representation of the semantic item determined by the URLLN 120 from a resource 160 (step 11), and in response to its request, the UE 110 receives the determined representation of the information asset from the resource 160 according to a SIP OK procedure (step 12).

The artisan will understand that the transport protocol used in the example illustrated by FIG. 1 is HTTP, but that protocol is not always required. In general, any transport protocol that supports redirect messages as depicted is possible, such as RTSP. Moreover, the redirect message sent by the URLLN 120 (step 10) can cause a change between protocols, e.g., from HTTP to RTSP, which can be advantageous for UEs like mobile phones that can have limited power and processing capabilities. In addition, it will be understood that the network nodes 110, 120, 130, 140, 150, 160 implement functionalities described in this application with one or more suitably programmed electronic digital signal processors or equivalent with memory that handles information carried by signals exchanged by a UE and other entities in the network 100.

It will also be understood that the representation URL need not point to an actual location of a requested asset, such as the source 160, but can point to a completely different location and be handled with redirects there again. An example of such an arrangement is a representation URL that points to a CDN, which itself redirects the UE to a location closest to the UE.

The URLLN 120 can also acquire information about the delivery context (steps 6, 7) from the UE itself. Currently, the SDP can be used to negotiate device-specific delivery parameters, but approaches to exposing device capabilities on the device itself are being developed. For example, Delivery Context Client interfaces (DCCI) was a project by the World Wide Web Consortium (W3C) that was a sub-project of W3C's Delivery Context Ontology (DCO) project.

The artisan will understand that the methods and apparatus described in this application can be implemented in many types of electronic communication networks, such as mobile radio networks.

Figure 2:
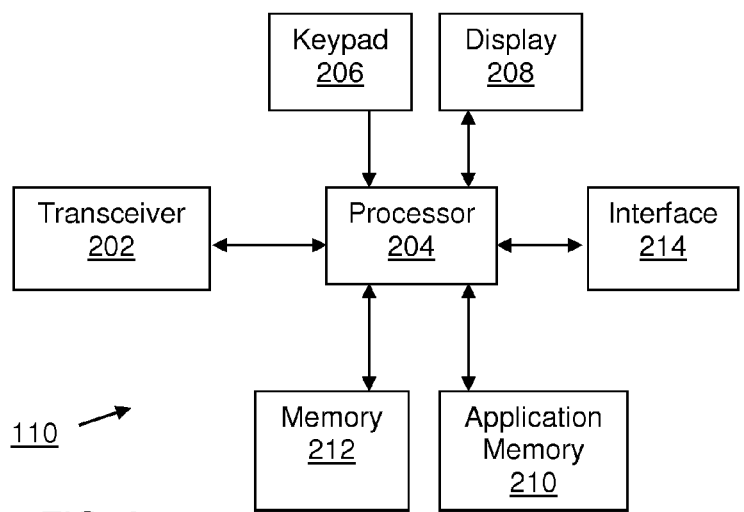
FIG. 2 is a block diagram of a user equipment.

FIG. 2 is a block diagram of a typical UE 110, such as a mobile phone, STB, computer, etc., for accessing content as described in this application. The UE 110 includes a transceiver 202 that is suitable for exchanging electronic signals with one or more of the network entities depicted in FIG. 1. Information carried by those signals is handled by a processor 204, which may include one or more sub-processors, and which executes one or more software modules and applications, including for example a web browser, to carry out the operations of the UE 110 described above. User input to the UE 110 is provided through a keypad, remote control, or other device 206, and information presented to the user is provided to a display 208. If the display has touch-screen capabilities, user input can be provided through the display. Software applications may be stored in a suitable application memory 210, and the UE may also download and/or cache desired information in a suitable memory 212. The UE 110 may also include an interface 214 that can be used to connect other components, such as a computer, microphone, etc., to the UE 110.

A user requests a semantic item via the keypad 206 or the interface 214 and causes the processor 204, using information in the memories 210, 212, to generate the appropriate HTTP GET request message (steps 1, 10) and send that message to the URLLN 120 via the transceiver 202. The transceiver 202 and processor 204 also implement the SIP messaging for content delivery (step 12), and the processor 204 may then present the content to the user via the display 208.

Figure 3:
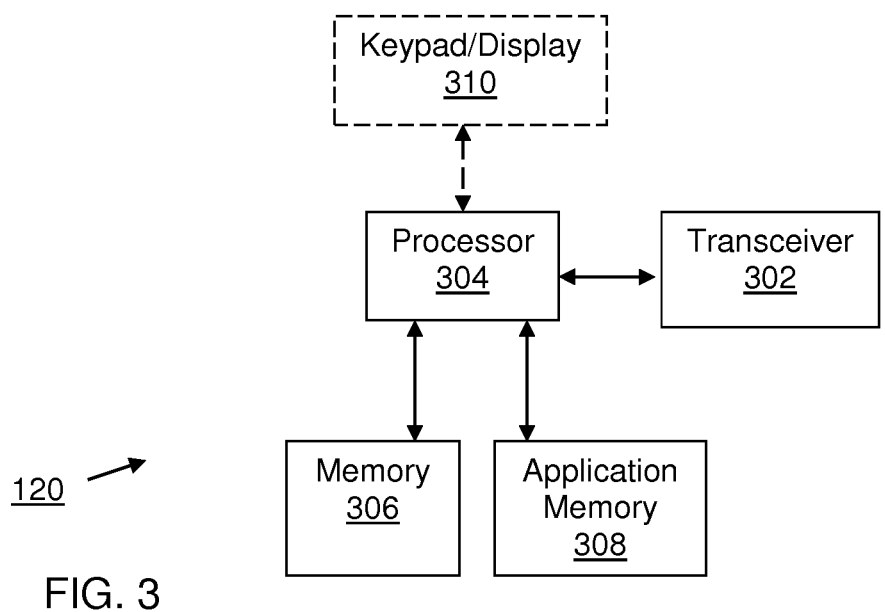
FIG. 3 is a block diagram of a URL logic node.

FIG. 3 is a block diagram of a typical URLLN 120 for gathering information relevant for delivery processes triggered by user requests and responding to user requests as described in this application. The URLLN 120 includes a transceiver 302 that is suitable for exchanging electronic signals with one or more of the network entities depicted in FIG. 1. Information carried by those signals is handled by a processor 304, which may include one or more sub-processors, and which executes one or more software modules and applications to carry out the operations of the URLLN 120 described above. In particular, the processor 304 carries out messaging needed for querying and receiving information from the databases 130, 140 and node 150, as well as determining representations of requested semantic items that are suitable for UEs 110 and for signaling determined representation to the UEs. The processor 304 can carries out those operations with information stored in a suitable memory 306 and software applications that may be stored in a suitable application memory 308. It will be understood that a typical URLLN 120 is a server in the network 100 and so a keypad/display 310 is usually not needed for user input/output, although such interfaces may be provided for administrative functions.

This invention increases the control on media delivery on the internet by different protocols using URLs. In accordance with the invention, existing protocols and technology are used on the client side, and thus implementation can be completely transparent to a UE. Network operators can provide smarter delivery paths and thus reduce traffic on links in the network and conserve streaming and other capabilities by redirecting UEs to external streaming services. In addition, operators can provide increased value to content providers by delivering content in the manner most suitable to the client. From its position in the content-delivery path, an operator can also provide additional services, such as charging and digital rights management (DRM), for itself as well as for third parties. An advantage for users is that they can focus on requested information and avoid dealing with multiple representations, formats, protocols, and hyperlinks pointing to the same information.

It will be appreciated that procedures described above are carried out repetitively as necessary, for example, to respond to the time-varying nature of communication signals exchanged by transmitters and receivers. Assemblies implementing this invention can be included in, for example, computers, servers, wireless communication network base stations, and the like.

Thus, the invention may be embodied in many different forms, not all of which are described above, and all such forms are contemplated to be within the scope of the invention.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of employing a semantic uniform resource locator (URL) corresponding to information to be displayed to a user of an electronic communication network, comprising:
receiving an information request message at a node in the electronic communication network, wherein the information request message includes a semantic URL and an identifier of a user equipment, wherein the semantic URL maps to a set of two or more objects;
based on the information request message, gathering information relevant for delivery of information corresponding to the semantic URL, wherein gathering information comprises transmitting to a network monitoring node a network status information request for network status information about a communication link directly between the user equipment and a network node that is currently being used to transmit data to the user equipment and receiving from the network monitoring node said requested network status information about the communication link, wherein the received network status information about the communication link comprises link status information specifying a current status of the communication link that is currently being used to transmit data to the user equipment, wherein the link status information comprises information on a link quality of the communication link and the current network status comprises information on an available throughput on the communication link, wherein the information on the available throughput comprises information on when the communication link is operating near its maximum throughput;
querying a metadata database for information identifying a first available version of the information corresponding to the semantic URL and a second version of the information corresponding to the semantic URL, wherein the first version of the information has a first media language and the second version of the information has a second media language different than the first media language;
based at least in part on said information on said link quality of the communication link, determining a version of the information corresponding to the semantic URL that is suitable for the user equipment, wherein the determining the version of the information corresponding to the semantic URL that is suitable for the user equipment comprises selecting an object from said set of objects based on the gathered information; and
sending to the user equipment a redirect message that i) comprises an object identifier that identifies the selected object and ii) causes the user equipment to transmit a request for the selected object, wherein the request includes the object identifier.

2. The method of claim 1, wherein gathering information further comprises querying a metadata database for information identifying a first available version of the information corresponding to the semantic URL and a second version of the information corresponding to the semantic URL, wherein the first version of the information has a first bitrate and the second version has a second bitrate greater than the first bitrate.

3. The method of claim 2, wherein the information identifying the first version of the information and the second version of the information comprises a first URL corresponding to the first version of the information and a second URL corresponding to the second version of the information.

4. The method of claim 1, further comprising sending the user equipment a communication protocol for accessing the determined version of the information.

5. The method of claim 4, wherein a communication protocol of the information request message is different from the communication protocol identified in the redirect message.

6. The method of claim 1, wherein determining the version of the information comprises:
determining a first weight value (W1) based on the link status information specifying a current status of the communication link;
determining a second weight value (W2); and
using the determined weight values to evaluate a predetermined cost function.

7. The method of claim 6, wherein the predetermined cost function is given by:

$$Cost = W1 \cdot Codec\_Cost + W2 \cdot Resolution\_Cost,$$

wherein Cost is a value to be determined, Codec_Cost is a value either based on a codec in the user equipment or calculated based on at least one of the version of the information's bit rate and frame rate, and Resolution_Cost value is a measure of a subjective quality expected for the version of the information.

8. The method of claim 7, wherein the Resolution_Cost value is given by:

$$Resolution\_Cost = 0.5 \cdot 1(resX\_a - resX\_b)I(resX\_a + resX\_b)1 + 0.5 \cdot Distance\_Aspect$$

in which resX_a is a resolution of a source version of the information; resX_b is a resolution of a display of the user equipment; and Distance_Aspect=0 if an aspect ratio of the source version of the information is substantially the same as an aspect ratio of the display of the user equipment, and otherwise Distance_Aspect=1.

9. The method of claim 1, wherein the information on the link quality comprises information that identifies an amount of available capacity on the communication link.

10. The method of claim 1, wherein the link status information specifies a current utilization of the communication link.

11. The method of claim 1, wherein the network monitoring node is one of: i) a node in a radio access network (RAN) and ii) a core network node in a Long Term Evolution (LTE) core network.

12. The method of claim 1, wherein the first version of the information has a first resolution and the second version of the information has a second resolution that is higher than the first resolution.

13. The method of claim 1, wherein the first version of the information is encoded according to a first codec and the second version of the information is encoded according to a second codec that is different than the first codec.

14. The method of claim 1, wherein the first version of the information is stored at a first location and the second version of the information is stored at a second location that is closer to the user equipment than the first location.

15. A uniform resource locator logic node for employing a semantic uniform resource locator (URL) corresponding to information to be displayed to a user of an electronic communication network, wherein the semantic URL maps to a set of two or more objects, comprising:
a transceiver configured for exchanging electronic signals with one or more entities of an electronic communication network;

an electronic processor programmably configured to handle information carried by the electronic signals; and a memory configured to store retrievable information; wherein the processor is configured to gather information relevant for delivery of information corresponding to the semantic URL included in an information request message received from a user equipment by at least transmitting to a network monitoring node a network status information request for network status information about a communication link directly between the user equipment and a network node that is currently being used to transmit data to the user equipment and receiving from the network monitoring node said requested network status information about the communication link, wherein the received network status information about the communication link comprises link status information specifying a current status of the communication link that is currently being used to transmit data to the user equipment, wherein the link status information comprises information on a link quality of the communication link and the current network status comprises information on an available throughput on the communication link, wherein the information on the available throughput comprises information on when the communication link is operating near its maximum throughput, query a metadata database for information identifying a first available version of the information corresponding to the semantic URL and a second version of the information corresponding to the semantic URL, wherein the first version of the information has a first media language and the second version of the information has a second media language different than the first media language, based at least in part on said information on said link quality of the communication link, determine a version of information corresponding to the semantic URL that is suitable for the user equipment wherein the determine the version of the information corresponding to the semantic URL that is suitable for the user equipment comprises selecting an object from said set of objects based on the gathered information, and send to the user equipment a redirect message that i) comprises an object identifier that identifies the selected object and ii) causes the user equipment to transmit a request for the selected object, wherein the request includes the object identifier.

16. The node of claim 15, wherein the processor is further configured to gather information by querying a metadata database for information identifying a first available version of the information corresponding to the semantic URL and a second version of the information corresponding to the semantic URL, wherein the first version of the information has a first bitrate and the second version has a second bitrate greater than the first bitrate.

17. The node of claim 15, wherein the processor is further configured to cause the node to send the user equipment a communication protocol for accessing the determined version of the information.

18. The node of claim 17, wherein a communication protocol of the information request message is different from the communication protocol identified in the redirect message.

19. The node of claim 15, wherein the processor is configured to determine the version of the information by:
  determining a first weight value (W1) based on the link status information;
  determining a second weight value (W2); and,
  using the weight values to evaluate a predetermined cost function.

20. The node of claim 19, wherein the predetermined cost function is given by:

$$Cost = W1 \cdot Codec\_Cost + W2 \cdot Resolution\_Cost$$

in which Cost is a value to be determined, Codec_Cost is a value either based on a codec in the user equipment or calculated based on at least one of the version of the information's bit rate and frame rate, and Resolution_Cost value is a measure of a subjective quality expected for the version of the information.

21. The node of claim 20, wherein the Resolution_Cost value is given by:

$$Resolution\_Cost = 0.5 - 1(resX\_a - resX\_b)I(resX\_a + resX\_b)1 + 0.5 \cdot Distance\_Aspect$$

in which resX_a is a resolution of a source version of the information; resX_b is a resolution of a display of the user equipment; and Distance_Aspect=0 if an aspect ratio of the source version of the information is substantially the same as an aspect ratio of the display of the user equipment, and otherwise Distance_Aspect=1.

* * * * *